Dec. 15, 1936.  G. A. HINDS  2,064,748

MACHINE FOR PLUCKING HOPS

Filed Dec. 17, 1935  5 Sheets-Sheet 1

C. A. Hinds
INVENTOR

By: Glascock Downing Seebold
Attys.

Dec. 15, 1936.　　　　G. A. HINDS　　　　2,064,748
MACHINE FOR PLUCKING HOPS
Filed Dec. 17, 1935　　　5 Sheets-Sheet 3

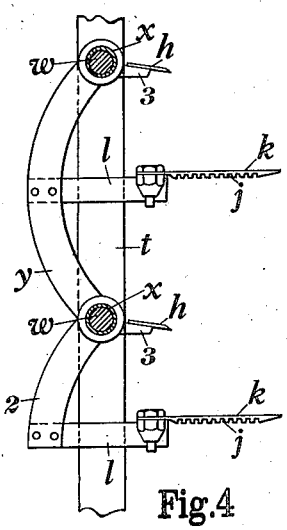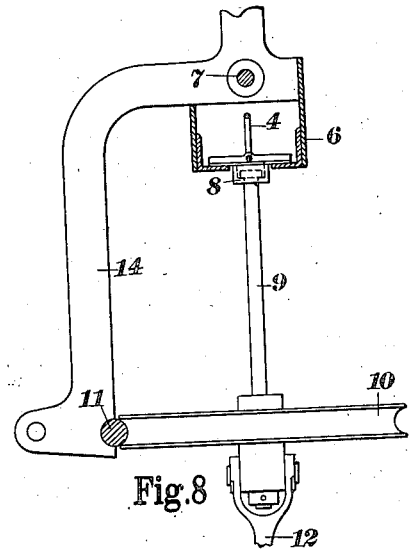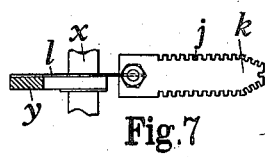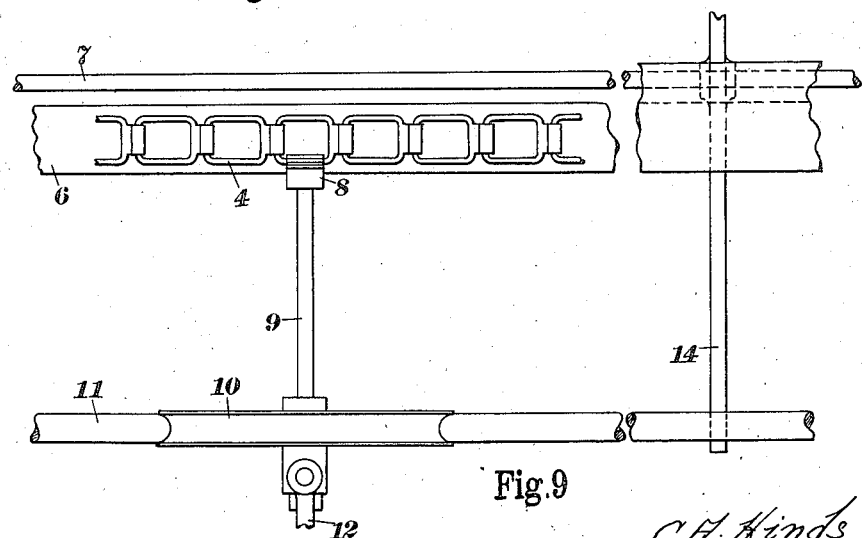

Dec. 15, 1936.  G. A. HINDS  2,064,748
MACHINE FOR PLUCKING HOPS
Filed Dec. 17, 1935    5 Sheets-Sheet 5
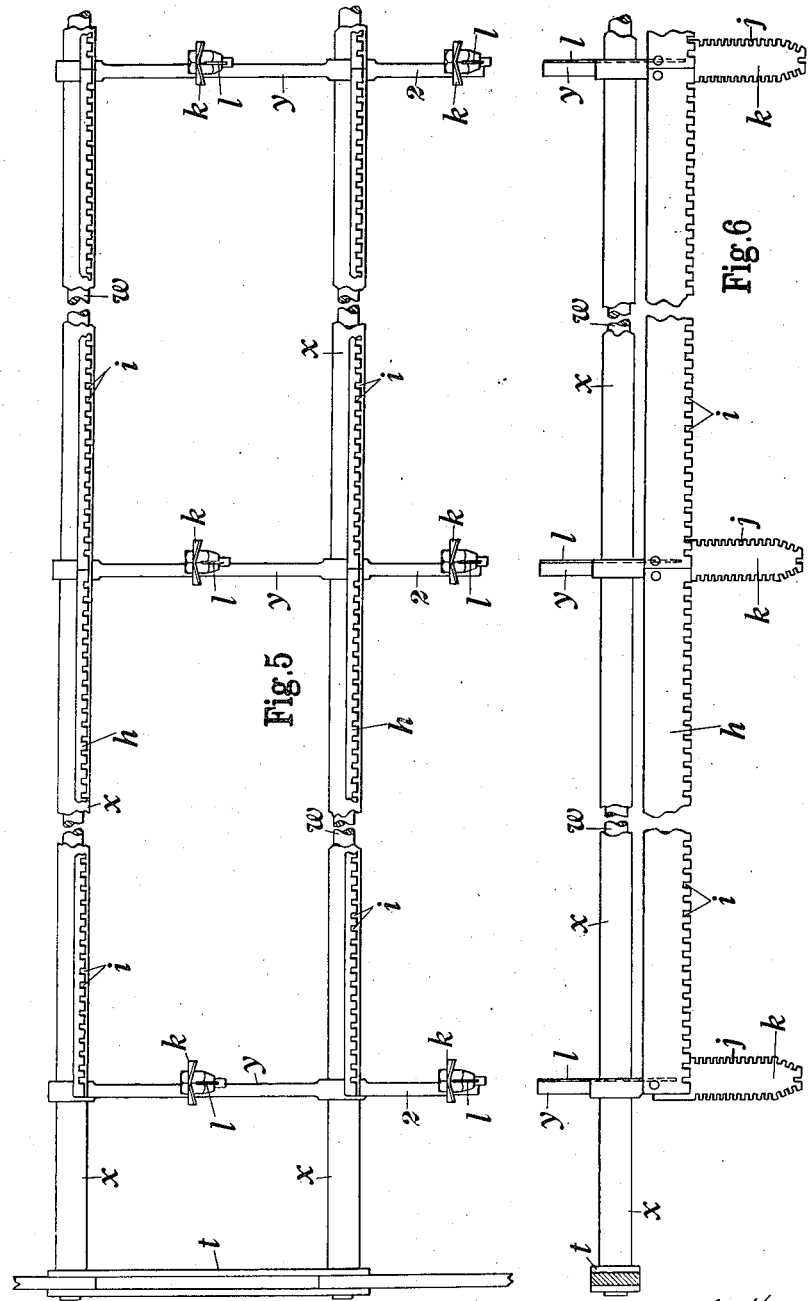

Patented Dec. 15, 1936

2,064,748

UNITED STATES PATENT OFFICE 2,064,748

MACHINE FOR PLUCKING HOPS

George Arthur Hinds, Malvern, England, assignor of one-half to Frederic Whigham McConnel, Barbers, Martley, England Application December 17, 1935, Serial No. 54,924
In Great Britain December 22, 1934

11 Claims. (Cl. 130—30)

This invention has for its object to provide an improved machine for plucking hops, that is to say for detaching the flowers or cones from the main parts of the plants (commonly termed vines or bines).

The invention comprises, for use in such a machine, a plucker in the form of a comb-like device having notches adapted to be engaged by only the thinner stems of the plants, namely those attached to or in the immediate neighbourhood of the flowers.

The invention also comprises the combination of a plurality of the aforesaid pluckers, movable means on which the pluckers are mounted, means for suspending the hop plants in the inverted condition adjacent to the pluckers, and means for producing relative movements between the pluckers and plants.

In particular the invention comprises the combination of an endless conveyor, pluckers as aforesaid carried on this conveyor, an overhead conveyor fitted with means from which the hop plants can be suspended, the second conveyor being movable in a line parallel with a plane containing the working side of the plucker conveyor, and means for reciprocating or swinging the hop plants towards and away from the working side of the plucker conveyor.

Further the invention comprises the combination with plucker and plant conveyors, of means for producing an air stream whereby the plants are moved towards the pluckers, and means for intermittently interrupting the air stream.

Also the invention comprises certain subsidiary features which are hereinafter described and claimed.

In the five accompanying sheets of explanatory drawings:—

Figure 4 is an end elevation, Figure 5 a front elevation and Figure 6 a plan showing to a larger scale than Figures 2 and 3 a portion of the plucker conveyor, Figure 7 is a plan of one of a number of subsidiary pluckers also carried on this conveyor.

Figure 8 is a sectional end elevation and Figure 9 a front elevation showing to a larger scale than Figures 2 and 3 a part of the plant conveyor.

Figure 1:
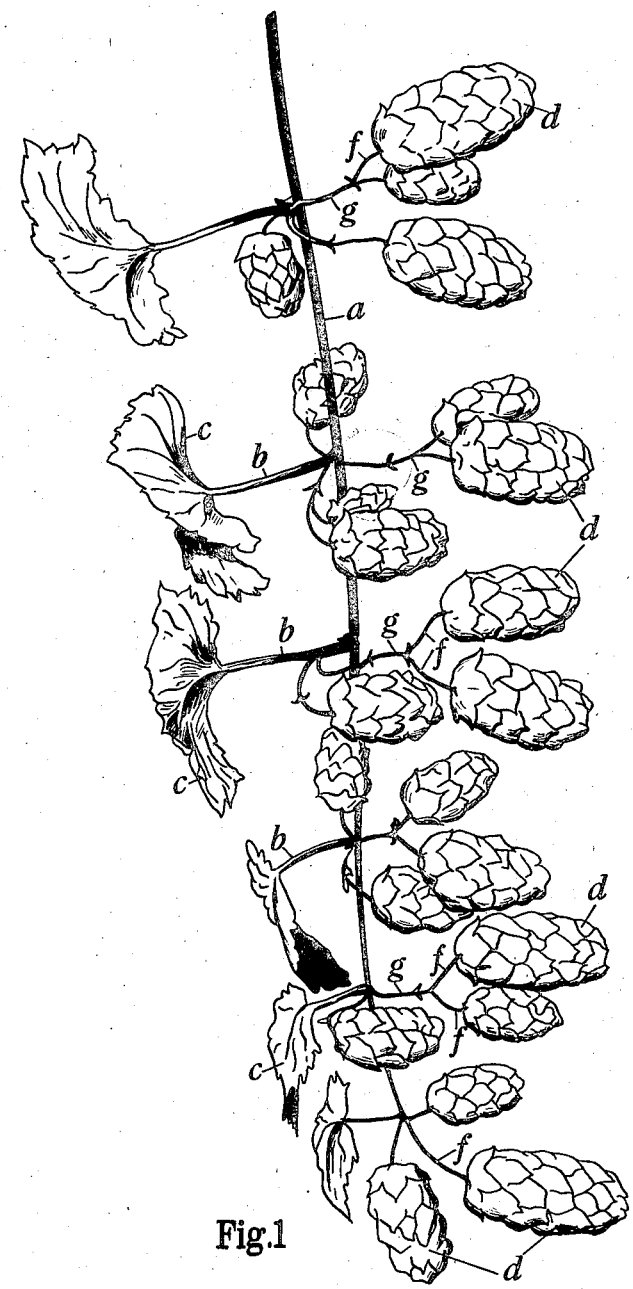
Figure 1 represents a branch of a hop plant.

With reference to Figure 1 what is shown there is one of the many branches which spring from the main stem of the hop plant. This branch consists of a relatively thick stem $a$ from which extend laterally a number of thinner stems $b$ carrying the leaves $c$. The hop flowers $d$ are carried by stems $f$, $g$, which are thinner than the others, the thinnest stems being those directly attached to the flowers.

The problem to be attacked is that of detaching mechanically the flowers $d$ without detaching the larger leaves $c$. It is desirable not to detach any of the leaves, but no inconvenience results if the smallest leaves, which are relatively few in number and are carried by very thin stems, are removed from the plant with the flowers.

My invention depends primarily on the use of pluckers which can only be engaged by the thinner stems on the plant, such as those marked $f$, $g$, that is to say the stems $f$ directly attached to the flowers, or those $g$ which connect the stems $f$ to the thicker stem or stems as $a$. A suitable width of notch is about 1.5 m. m.

On reference to Figures 4–7, the form of the pluckers will be clearly seen. The main pluckers $h$ consist of steel or other strips each having one edge formed with short and narrow notches $i$. Preferably these notches have parallel sides, but it is essential that the width of the notches shall be such as will permit the entrance of only the thinner stems of the plant, particularly those marked $f$ and $g$ in Figure 1. In other words the notches are such that they cannot engage the thicker stems as $a$ and $b$.

In addition to the main pluckers $h$ I also prefer to employ subsidiary pluckers $k$ (Figures 4–7) which are formed with notches $j$ similar to those $i$ in the main pluckers $h$. The subsidiary pluckers extend at right angles to the main pluckers, and are carried by flexible metal strips $l$ or other resilient means so that they can readily yield. As will be explained more fully later the hop plants are moved along a line which is parallel with the notched edges of the main pluckers, and the subsidiary pluckers lie across the path of the plants.

Figure 2:
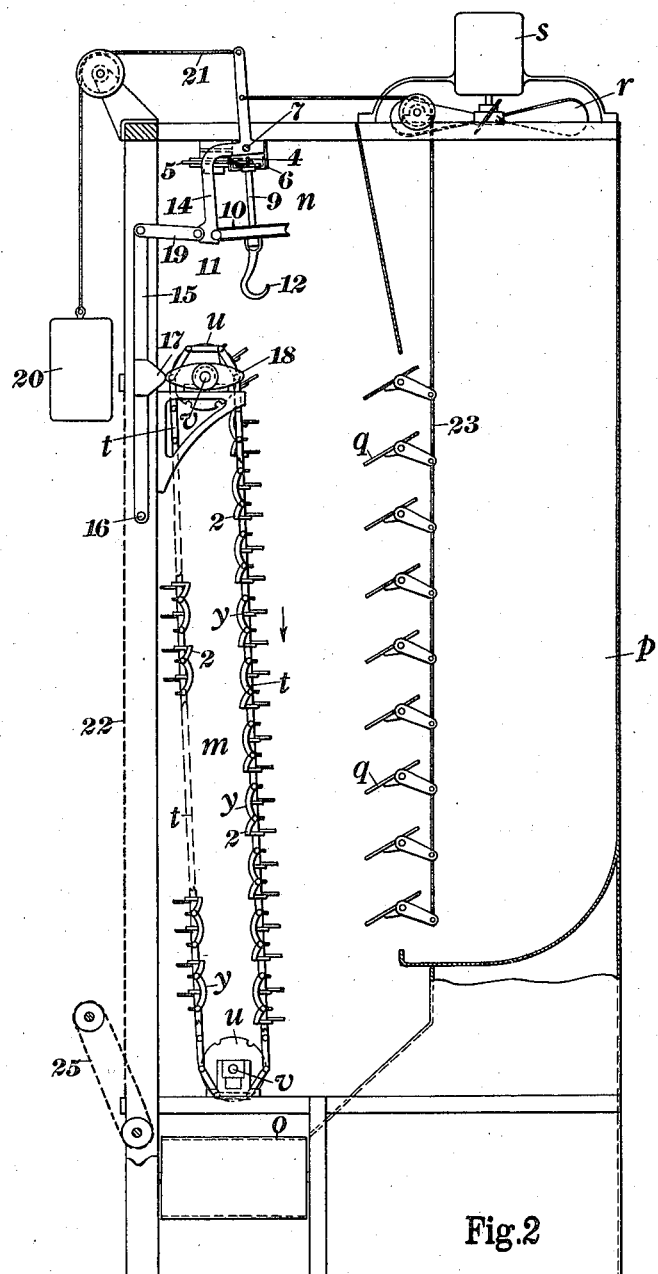
Figure 2 is a sectional end elevation, and Figure 3 a sectional front elevation of a hop plucking machine constructed in accordance with this invention.
Figure 3:
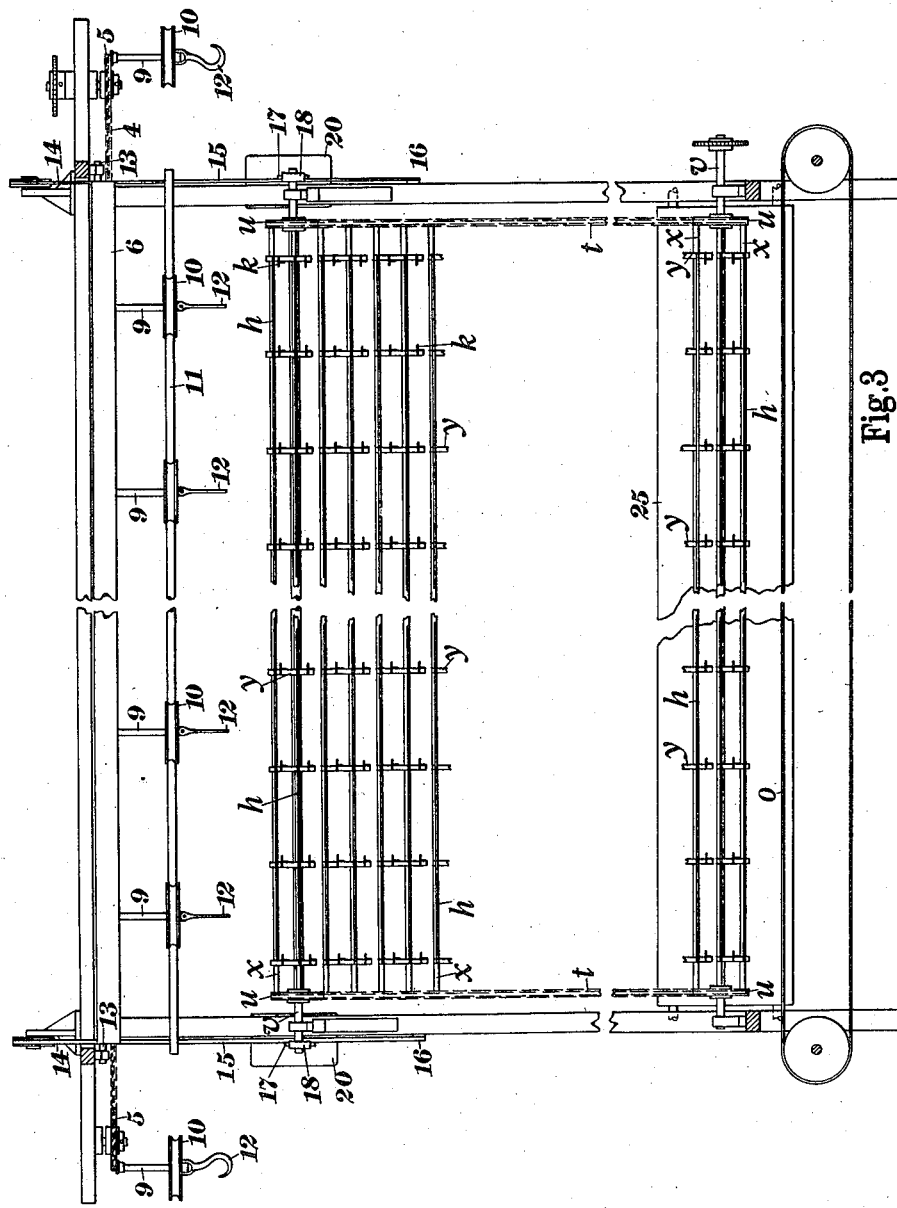

Before describing the details of the machine, it may be useful to describe the main features with reference to Figures 2 and 3. The machine there shown comprises a structure containing the following principal parts, namely, a plucker conveyor $m$, an overhead plant conveyor $n$, a lower conveyor $o$ for catching and removing from the machine the plucked flowers, and an air chamber $p$ fitted at one side with louvres $q$, and a fan $r$ driven by an electric motor $s$ for producing an air stream through the chamber.

The hop plants are suspended in the inverted position (that is to say with the root ends uppermost) from the overhead conveyor and are thereby carried across the adjacent face of the plucker conveyor. During this movement the plants are also reciprocated or swung towards and away from the pluckers in a manner which will be fully described later, and the detached flowers, with perhaps some of the smallest of the leaves, fall on to the conveyor o. The overhead conveyor has the plants attached to it at any convenient position outside the machine, and the plucked plants are removed from it at another position which is also outside the machine.

Passing now to a more detailed description, and dealing first with the pluckers and their conveyor, it will be seen on reference to Figures 1–6 of the drawings, that the conveyor comprises a plurality of endless chains $t$ spaced at a suitable distance apart. In Figure 2 only the end chains are shown, but there may be a number of similar chains at intermediate positions, the number of chains depending on the length of the machine. Each chain is carried on upper and lower sprockets $u$ carried on shafts $v$ either of which is driven by any convenient mechanical means. The pivots by which the links of the chains are connected together are formed by rods $w$ which are common to at least one pair of chains and may be common to all the chains, and these rods are arranged parallel to each other. On the rods $w$ are mounted tubes $x$, and to each adjacent pair of tubes are secured at a convenient distance apart a number of bearers $y$. These latter are to be seen more clearly in Figures 4–7. Each bearer is attached to a pair of tubes $x$ and at one end is formed with an extension 2. At the part of the bearer adjacent to each tube is formed a lug 3 for the attachment thereto of a main plucker $h$, a number of these latter being arranged end to end along the front side of each tube $x$. The flexible strips $l$ carrying the subsidiary pluckers $k$ are attached as shown to the bearers $y$, two such pluckers being carried on each bearer, one at an intermediate part of the bearer and the other on the extension 2 as will be seen in Figures 4 and 5.

As will be readily seen in the drawings, the main pluckers $h$ extend across the whole width of the plucker conveyor, and the subsidiary pluckers project outwards at right angles to the conveyor. Both main and subsidiary pluckers are notched as already described for engagement only with the thinner stems of the plant. The direction of motion of the plucker conveyor is such that its working face moves downwards as indicated by the arrow in Figure 2. While the plants are moving along the working face of the plucker conveyor the main pluckers engage the flower stems and by their downward movement detach the flowers which then drop down to and are caught by the conveyor o. Also the subsidiary pluckers $k$ which lie across the path of movement of the plants attack the parts of the plants which might not be brought into contact with the main pluckers, and as these subsidiary pluckers can readily yield in any direction (by the bending and twisting of the parts $l$) they offer no inconvenient obstruction to the plants.

The plant conveyor $n$ comprises an endless chain 4 carried by suitably arranged sprockets of which two are shown in Figure 3, these being marked by the reference numeral 5. Any one of the sprockets is driven by any convenient mechanical means. The part of this chain which lies within the machine moves along a channel 6 having a slot in its base, and this channel is carried by a pivot shaft 7. Attached to one edge of the chain are a number of sliders 8 which are supported on the bottom of the channel, and to each slider is rotatably attached the upper end of a spindle 9 the lower end of which carries a roller 10 running in contact with a guide rail 11. At the lower end of the spindle beneath the roller is secured a hook 12 from which a hop plant can be suspended. While the hooks are being carried through the plucking region of the machine they are also given a rotary motion by the interaction of the rollers 10 and rail 11 so as to cause all parts of the plants to be brought into contact with the pluckers.

As above mentioned the channel 6 is carried by a pivot shaft 7. This shaft is supported by bearings 13. To the channel are attached levers 14 which also carry the rail 11, and each of these levers is connected by a link 19 to a lever 15 pivoted at 16. Each of the levers 15 is provided with an abutment 17 which co-operates with a cam 18 on the shaft $v$ carrying the upper sprockets $u$ of the plucker conveyor.

During the rotation of the said shaft $v$ the cams 18 oscillate the levers 15 and so cause the channel 6 to be rocked about the axis of the shaft 7, the conveyor chain 4 being sufficiently flexible to allow of this movement. By the rocking of the channel the rail 11 on the levers 14 gives a lateral reciprocation or swinging movement to the hooks 12 and so causes the suspended plants to swing relatively to the working face of the plucker conveyor. In the example illustrated the cams 18 move the levers 15 in one direction only, the reverse movement being produced by the action of a weight 20 connected to each of the levers 14 by a rope or other flexible member 21.

From the foregoing it will be understood that while the conveyor chain is carrying the suspended plants along the working face of the plucker conveyor there is also given to the plants a swinging movement to and from the face of the plucker conveyor. Therefore whilst the plucker conveyor moves with a continuous motion its action on the plants is intermittent. Further, as a rotary motion is also given to the plants all parts of the plants are brought into contact with the pluckers.

The swinging of the plants to and from the plucker conveyor is augmented by the air stream discharged from the chamber $p$ through the louvres $q$. As already mentioned this stream is produced by the fan $r$ and when the louvres are open the air stream blows the plants towards the pluckers. The stream passes through the plucker conveyor and out through the open adjacent side of the machine which is covered by a wire mesh 22. Apart from assisting the action of the rocking mechanism above described the air stream serves a further important purpose, in that it causes the leaves on the plants to turn and present their edges to the stream, thus minimizing the obstruction of the pluckers by the flat surfaces of the leaves lying between the pluckers and the flowers. Also the air stream tends to facilitate detachment of any flowers that may adhere to the pluckers.

It is necessary, however, that the action of the air stream shall be intermittent in order that the plants may swing freely away from the pluckers when carried towards the right (Figure 2) by the rocking mechanism. The louvres are therefore interconnected with each other and with the levers 14 by a flexible member or members 23, so that the louvres are allowed to open when the plants are being moved towards the pluckers and caused to close when the plants are moved in the opposite direction. Any convenient means may be employed to effect the opening movement. Thus the louvres may be counterweighted, or a weight may be attached to the lower end of the member 23.

The flowers detached from the plants drop on to the endless conveyor o which is driven by any convenient means, and are thereby carried out of the machine. Any leaves that may have fallen from the plants on to the conveyor may be removed before the conveyor discharges the flowers, by arranging alongside the conveyor a small conveyor 25 arranged as shown in Figure 2 and comprising an endless band in the form of a flexible mesh. The air stream in the lower part of the plucking chamber tends to blow the light leaves and some of the flowers on to the adjacent face of the conveyor 25 which moves in the upward direction. The leaves will adhere under the action of the air stream, but the flowers roll back on the conveyor o. When the leaves reach the top of the conveyor 25 which is outside the machine they fall off and are deposited in a receptacle or in a heap on the floor.

Summarizing the working of the machine, the hop plants are attached in the inverted condition to the hooks 12 on the overhead conveyor n. While travelling through the machine the plants are given a lateral swinging movement relatively to the working face of the plucker conveyor, which action is augmented by the intermittent air stream. They are also given a rotary motion. During this stage the hop flowers are detached from the plants and collected on the conveyor o. After passing out of the machine the plucked plants are taken off the hooks leaving the latter clear for the attachment of other plants to be treated.

The invention is not limited to the example above described as the essential features described may be combined and adapted to co-operate in a variety of ways. Also subordinate details of design and construction may be varied to suit different requirements.

Having thus described my invention what I claim as new and desire to secure by Letters Patent is:—

1. A machine for plucking the flowers from hop plants, comprising the combination of an overhead conveyor for suspending and carrying the hop plants through the machine, a plurality of pluckers in the form of comb-like strips having notches of such dimensions that they can be engaged only by the thinner stems of the plants, a conveyor carrying the pluckers and arranged so that the active pluckers move downwards in the direction of the length of the plants, and means for producing relative lateral movements between the plants and pluckers, substantially as described.

2. A machine for plucking the flowers from hop plants, comprising the combination of an overhead conveyor for suspending and carrying the hop plants through the machine, a plurality of pluckers in the form of comb-like strips having notches of such dimensions that they can be engaged only by the thinner stems of the plants, a conveyor carrying the pluckers and arranged so that the active pluckers move downwards relatively to one side of the plants, and means associated with the overhead conveyor whereby the plants are reciprocated in lateral directions relatively to the pluckers, substantially as described.

3. A machine for plucking the flowers from hop plants, comprising the combination of an overhead conveyor for suspending and carrying the plants through the machine, a plurality of pluckers in the form of comb-like strips having notches of such dimensions that they can be engaged only by the thinner stems of the plants, a conveyor carrying the pluckers and arranged so that the active pluckers move downwards relatively to one side of the plants, means associated with the overhead conveyor whereby the plants are rotated and reciprocated in a lateral direction relatively to the pluckers, substantially as described.

4. A machine for plucking the flowers from hop plants, comprising the combination of an overhead conveyor for suspending and carrying the hop plants through the machine, a plurality of pluckers in the form of comb-like strips having notches of such dimensions that they can be engaged only by the thinner stems of the plants, a conveyor carrying the pluckers and arranged so that the active pluckers move downwards relatively to one side of the plants, means whereby the plants are reciprocated in lateral directions relatively to the pluckers, and means for producing an intermittent air stream across the plants towards the pluckers, substantially as described.

5. In a machine for plucking the flowers from hop plants, the combination of an endless overhead conveyor, plant suspensory means on the conveyor, means for imparting lateral swinging movements to the said suspensory means, a plurality of pluckers in the form of comb-like strips having notches of such dimensions that they can be engaged only by the thinner stems of the plants, an endless conveyor carrying the pluckers and arranged so that the active pluckers move downwards relatively to one side of the plants, an air chamber, a fan for directing an air stream into the said chamber, louvres in the vertical side of the chamber adjacent to the plants, and means for producing opening and closing movements of the louvres which are correlated with the means for imparting lateral swinging movements of the plants, the louvres being open while the plants are moving towards the pluckers and closed during the reverse movement, substantially as described.

6. In a machine for plucking the flowers from hop plants pluckers in the form of comb-like strips having notches of such dimensions that they can be engaged only by the thinner stems of the plants, an overhead conveyor for suspending the plants and carrying them through the machine, the said conveyor comprising the combination of an endless chain, a pivoted channel for supporting the portion of the chain in the plucking region of the machine, rotatable spindles depending from the chain, a roller on each spindle, a rail with which the rollers co-operate for rotating the spindles during their movements by the conveyor, means for suspending the plants from the spindles, means interconnecting the channel and rail, lever mechanism for rocking the channel and rail, and cam mechanism acting on the lever mechanism, substantially as described.

7. In a machine as claimed in claim 6, and endless plucker conveyor, having associated therewith the cam mechanism for actuating the lever mechanism whereby rocking movements are given to the overhead conveyor, substantially as described.

8. In a machine as claimed in claim 6, the combination of an air chamber, means for supplying a stream of air to the said chamber, louvres in one side of the chamber, and louvre operating means interconnected with the means for rocking the overhead conveyor, substantially as described.

9. In a machine for plucking flowers from hop plants, the combination of a plurality of pluckers in the form of comb-like strips having notches of such dimensions that they can be engaged only by the thinner stems of the plants, an endless conveyor carrying the pluckers, an overhead conveyor for suspending the plants and carrying them through the machine, the plucker conveyor being arranged to move the active pluckers downwards relatively to the plants, means associated with the overhead conveyor for swinging the plants laterally, means for producing an air stream in the direction of the pluckers, louvres for controlling the air stream, means correlated with the plant reciprocatory mechanism of the overhead conveyor for intermittently actuating the louvres, a collecting conveyor in the lower part of the machine, and a perforated endless conveyor situated at one side of the collecting conveyor and adapted to carry small leaves away from the collecting conveyor, substantially as described.

10. In a machine for plucking flowers from hop plants, means for suspending and carrying the plants through the machine, an endless plucker conveyor comprising a plurality of chains, horizontal rods interconnecting the chains, tubes mounted on the rods, transverse bearers carried by the tubes, main longitudinal pluckers in the form of strips having an outer notched edge carried parallel with the tubes by the bearers, subsidiary notched pluckers projecting at right angles to the tubes flexible means connecting the latter pluckers to the bearers and means for producing relative lateral movements between the plants and the pluckers, the plucker conveyor being arranged so that the active pluckers move downwards relatively to one side of the plants, and the notches in both the main and subsidiary pluckers being of such dimensions that they can be engaged only by the thinner stems of the plants, substantially as described.

11. In a machine for plucking flowers from hop plants, the combination of an overhead conveyor from which the plants can be suspended, a substantially vertical conveyor, main pluckers on the latter conveyor, said pluckers being in the form of comb-like strips having notches which can be engaged only by the thinner stems of the plants, subsidiary pluckers having notches similar to those of the main pluckers and extending laterally from the plucker conveyor, resilient means carrying the subsidiary pluckers, and means for producing relative lateral movements between the plants and the main pluckers, substantially as described.

GEORGE ARTHUR HINDS.